United States Patent
Kim et al.

(10) Patent No.: US 8,658,297 B2
(45) Date of Patent: Feb. 25, 2014

(54) CAP ASSEMBLY AND SECONDARY BATTERY HAVING THE SAME

(75) Inventors: Yong-Sam Kim, Suwon-si (KR); Yoon-Cheol Jeon, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 1203 days.

(21) Appl. No.: 11/972,889

(22) Filed: Jan. 11, 2008

(65) Prior Publication Data

US 2008/0171260 A1 Jul. 17, 2008

(30) Foreign Application Priority Data

Jan. 15, 2007 (KR) .................. 10-2007-0004275

(51) Int. Cl.
*H01M 2/12* (2006.01)

(52) U.S. Cl.
USPC .............................................. 429/56; 429/53

(58) Field of Classification Search
USPC ................ 429/53, 56, 61, 71, 72, 82, 89, 163
See application file for complete search history.

(56) References Cited

U.S. PATENT DOCUMENTS

| | | | |
|---|---|---|---|
| 4,698,282 A * | 10/1987 | Mantello | 429/56 |
| 5,248,568 A * | 9/1993 | Getz | 429/56 |
| 5,609,972 A | 3/1997 | Kaschmitter et al. | |
| 6,006,842 A * | 12/1999 | Stilwell et al. | 169/60 |
| 2006/0078787 A1* | 4/2006 | Sato et al. | 429/62 |

FOREIGN PATENT DOCUMENTS

| | | |
|---|---|---|
| JP | 07-122247 | 5/1995 |
| JP | 10-241644 | 9/1998 |
| KR | 2001-81550 | 8/2001 |

OTHER PUBLICATIONS

English-language Abstract for KR 20-0228356.

* cited by examiner

*Primary Examiner* — Ula C Ruddock
*Assistant Examiner* — Scott J Chmielecki
(74) *Attorney, Agent, or Firm* — Knobbe Martens Olson & Bear, LLP (57) ABSTRACT

A cap assembly and a secondary battery having the same which can prevent current from flowing out of the battery by preventing contact of a broken vent member with a cap. The vent member is broken due to an internal pressure of the secondary battery greater than a predetermined level. The cap assembly includes a vent member having a plurality of notches formed in a radial direction from the center of the vent member and a plurality of reinforcement parts formed between the notches. The cap assembly may include a vent member having a plurality of notches formed between two adjacent notches so that the vent member folds when the internal pressure of the secondary battery is too great.

4 Claims, 6 Drawing Sheets

FIG. 1

RELATED ART

CAP ASSEMBLY AND SECONDARY BATTERY HAVING THE SAME

CROSS-REFERENCE TO RELATED APPLICATIONS

This application claims the benefit of Korean Patent Application No. 2007-4275, filed Jan. 15, 2007, in the Korean Intellectual Property Office, the disclosure of which is incorporated herein by reference.

BACKGROUND OF THE INVENTION

1. Field of the Invention

Aspects of the present invention relate to a cap assembly and a secondary battery having the same, and more particularly, to a cap assembly that can prevent current from flowing after breakage of a vent member caused by an internal pressure of the secondary battery greater than a predetermined level by preventing the broken vent member from contacting a cap.

2. Description of the Related Art

With recent development and production of portable electronic appliances having a compact, lightweight size, such as cellular phones, notebook computers. and video cameras, the electronic appliances require battery packs so as to operate in any place where power is not supplied. The battery pack, or rechargeable or secondary battery, is made of nickel-cadmium (Ni—Cd), nickel-metal hydride (Ni-MH), or lithium (Li).

Specifically, the Li secondary battery has been widely used to power the portable electronic appliances as the Li secondary battery has an operating voltage on the order of a three times higher than the Ni—Cd or Ni-MH batteries. Further, the Li second battery has a higher energy density per unit weight than the Ni—Cd or Ni-MH batteries. The Li secondary battery is classified according to a type of electrolyte used, such as a Li ion battery, which uses a liquid electrolyte, and a Li polymer battery, which uses a polymer electrolyte. The Li secondary battery is also classified according to the shape of the battery, such as cylindrical, rectangular, and pouch-shaped batteries.

Figure 1:
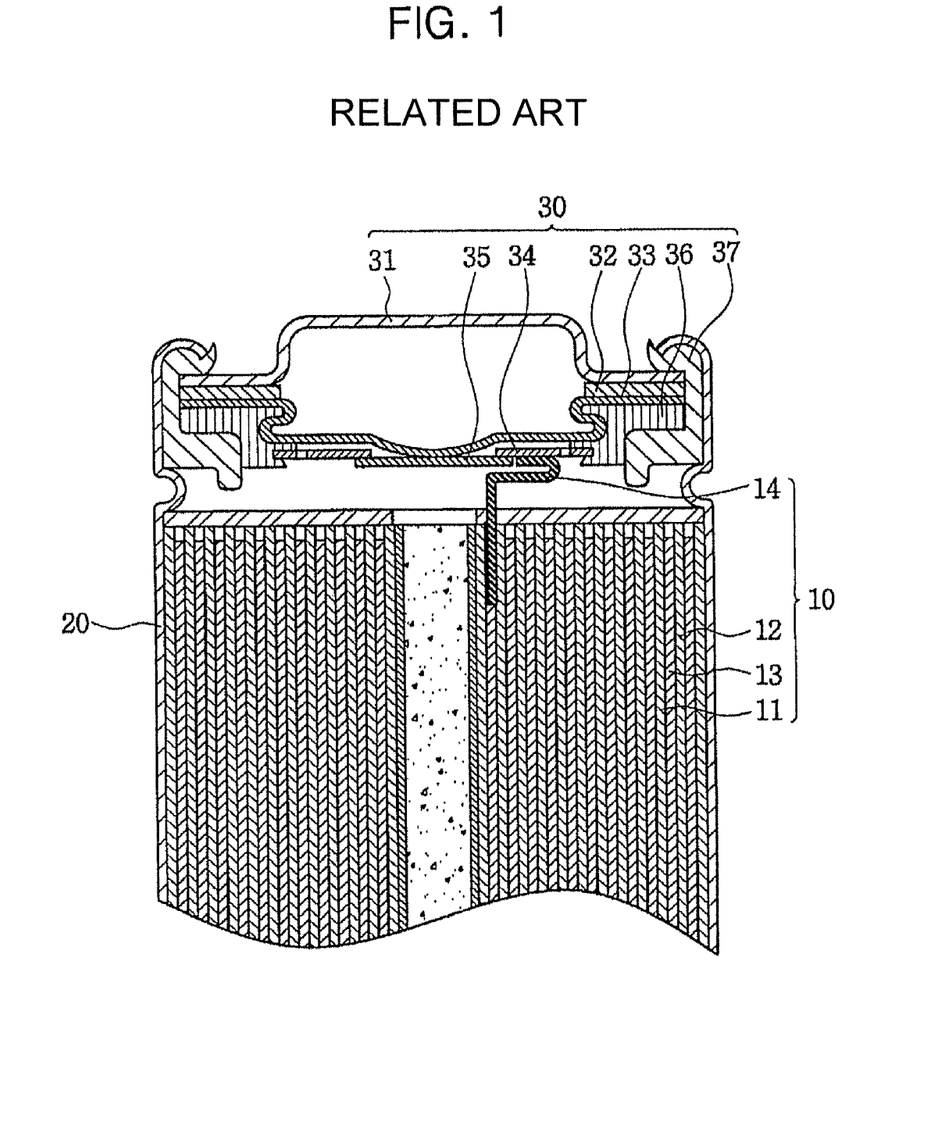
FIG. 1 is a cross-sectional view of a conventional secondary battery.

FIG. 1 is a cross-sectional view of a conventional secondary battery. Referring to FIG. 1, the conventional secondary battery includes an electrode assembly 10; a can 20 (e.g., a container) having an opened top and containing an electrolyte (not illustrated), which enables Li ions to move between the members of the electrode assembly 10; and a cap assembly 30 to seal the can 20. The cap assembly 30 is electrically connected to the electrode assembly 10. As shown in FIG. 1, the electrode assembly 10 includes: a positive electrode plate 11 having a positive electrode tap connected to a positive electrode collector (not illustrated) to which a positive electrode active material (not illustrated) is applied; a negative electrode plate 12 having a negative electrode tap connected to a negative electrode collector (not illustrated) to which a negative electrode active material (not illustrated) is applied; and a separator 13 disposed between the positive electrode plate 11 and the negative electrode plate 12 for insulating the two electrode plates 11 and 12 from each other. An electrode tap 14 may be connected from one of the positive electrode plate 11 and the negative electrode plate 12 to the cap assembly 30 disposed on the can 20 as shown in FIG. 1. In addition, another electrode tap (not shown) may be connected from the other of the positive electrode plate 11 and the negative electrode plate 12 to the can 20.

The positive electrode active material may include a transition metal oxide with a Li ion or a Li chalcogenide compound, for example, a metal oxide, such as $LiCoO_2$, $LiNiO_2$, $LiMnO_2$, $LiMn_2O_4$ or $LiNi_{1-x-y}Co_xM_yO_2$ (here, $0 \leq x \leq 1$, $0 \leq y \leq 1$, $0 \leq x+y \leq 1$, M is aluminum (Al), strontium (Sr), magnesium (Mg), lanthanum (La), etc.), and the negative electrode active material may include crystalline carbon, amorphous carbon, carbon complex, carbon material such as a carbon fiber, carbon nanomaterials such as carbon nanotubes, Li metal, or Li alloy.

The positive or negative electrode collector may be formed of one selected from the group consisting of stainless steel, nickel (Ni), copper (Cu), aluminum (Al) and an alloy thereof. Generally, the positive electrode collector is formed of Al or an Al alloy, and the negative electrode collector is formed of Cu or a Cu alloy, as such formation increases the efficiency of the battery.

The separator 13 is disposed between the positive electrode plate 11 and the negative electrode plate 12 to prevent a short circuit. The separator 13 further allows Li ions to move therethrough between the positive electrode plate 11 and the negative electrode plate 12. The separator 13 may be formed of a polyolefin-based polymer layer such as polyethylene (PE) or polypropylene (PP), or a multi-layer thereof.

The can 20 may be a container formed of a metallic material having an opened top and a cylindrical shape. Alternatively, the can 20 may be formed in a rectangular or pouch shape. The can 20 may be formed of a metallic material that is lightweight, flexible, and functional as a terminal, for example, Al, an Al alloy, or stainless steel.

The cap assembly 30 includes a cap 31 coupled with the top opening of the can 20 to seal the can 20 and connected to an external terminal (not shown); a vent member 33 which breaks to exhaust a gas when an internal pressure of the secondary battery is greater than a certain level due to the gas generated from the electrode assembly; a bottom cap 34 connected to the electrode tap 14; an insulating plate 36 to prevent unnecessary short-circuit between the bottom cap 34 and the vent member 33; and a gasket 37 to insulate the can assembly 30 from the can 20. A positive temperature coefficient (PTC) material 32 may be disposed between the cap 31 and the vent member 33 so as to improve the stability and reliability of the secondary battery, and a sub plate 35 may be disposed below the bottom cap 34.

In the cap assembly 30 of the conventional secondary battery, when the internal pressure of the secondary battery reaches a certain level caused by gas generated from the electrode assembly 10, the vent member 33 is broken to prevent current flowing from the battery and to exhaust the gas.

However, in the above-described cap assembly 30, if the broken vent member 33 is in contact with the cap 31, an arc may occur between the vent member 33 and the bottom cap 34 or the sub plate 35, which is disposed therebelow, such that current flows from the battery, which results in a decrease in reliability of the secondary battery.

SUMMARY OF THE INVENTION

Aspects of the present invention provide a cap assembly and a secondary battery having the same in which a broken vent member is not in contact with a cap to prevent current from flowing out of a battery even when an arc is generated between the vent member and the underlying element of the vent member.

According to an aspect of the present invention, a cap assembly comprises: a vent member having a plurality of notches formed in a radial direction from the center of the vent member, and a plurality of reinforcement parts formed between the notches and protruding to a predetermined height.

According to another aspect of the present invention, a secondary battery comprises: an electrode assembly having a positive electrode plate, a negative electrode plate, and a separator disposed between the two electrode plates; a can to contain the electrode assembly; and a cap assembly to seal the can and including a vent member having a plurality of notches formed in a radial direction from the center of the cap assembly and at least one reinforcement part formed between tow adjacent notches to protrude to a predetermined height.

According to still another aspect of the present invention, a cap assembly comprises: a vent member having a plurality of first notches formed in a radial direction from the center of the vent member, and a plurality of second notches formed to extend between two adjacent first notches.

According to yet another aspect of the present invention, a secondary battery comprises: an electrode assembly having a positive electrode plate, a negative electrode plate, and a separator disposed between the two electrode plates; a can to contain the electrode assembly; and a cap assembly to seal the can and including a vent member having a plurality of first notches formed in a radial direction from the center of the vent member and at least one second notch formed to extend between two adjacent first notches.

According to another aspect of the present invention, a cap assembly for a battery comprises: a vent member in which at least one notch is formed and at least one reinforcement member is formed, wherein the notch and the reinforcement member prevent current flow when the vent breaks.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
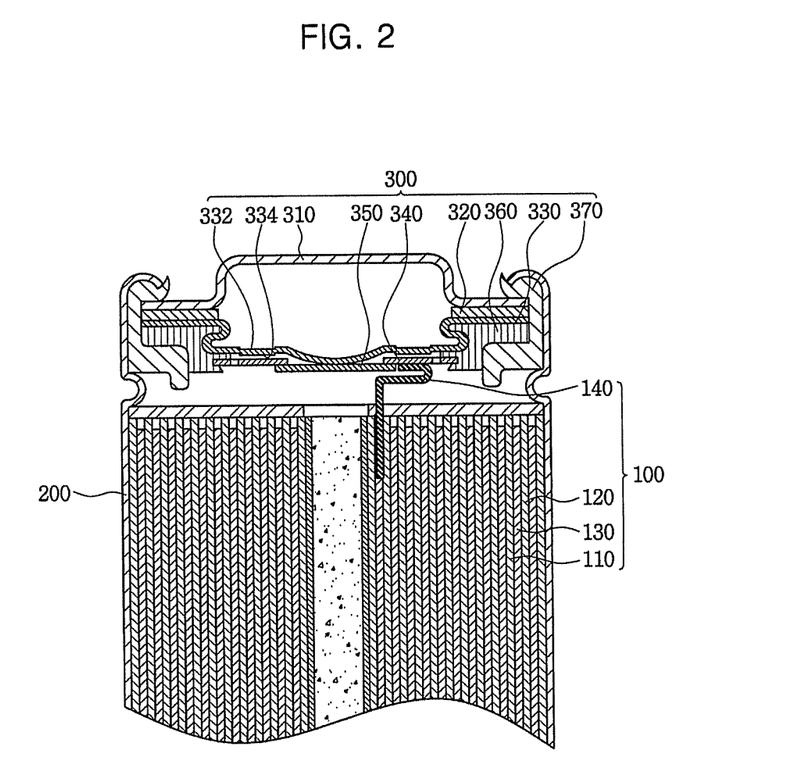
FIG. 2 is a cross-sectional view of a secondary battery having a cap assembly according to an example embodiment of the present invention.

FIG. 2 is a cross-sectional view of a secondary battery having a cap assembly according to an example embodiment of the present invention. Referring to FIG. 2, the secondary battery having a cap assembly includes an electrode assembly 100, a can 200 having an opened top and containing an electrolyte (not illustrated), which enables lithium (Li) ions to move between the members of the electrode assembly 100, and a cap assembly 300 to seal the can 200. The cap assembly 300 is electrically connected to the electrode assembly 100. Here, the electrode assembly 100 includes a positive electrode plate 110 having a positive electrode tap connected to a positive electrode collector (not illustrated) to which a positive electrode active material (not illustrated) is applied; a negative electrode plate 120 having a negative electrode tap connected to a negative electrode collector (not illustrated) to which a negative electrode active material is applied; and a separator 130 disposed between the positive electrode plate 110 and the negative electrode plate 120 to insulate the two electrode plates from each other. An electrode tap 140 may be connected from one of the positive electrode plate 110 and the negative electrode plate 120 to the cap assembly 300 disposed on the can 200 as shown in FIG. 2. In addition, another electrode tap (not shown) may be connected from the other of the positive electrode plate 110 and the negative electrode plate 120 to the can 200.

The positive electrode active material may include a transition metal oxide with a Li ion or a Li chalcogenide compound, for example, a metal oxide, such as $LiCoO_2$, $LiNiO_2$, $LiMnO_2$, $LiMn_2O_4$ or $LiNi_{1-x-y}Co_xM_yO_2$ (here, $0 \leq x \leq 1$, $0 \leq y \leq 1$, $0 \leq x+y \leq 1$, M is aluminum (Al), strontium (Sr), magnesium (Mg), lanthanum (La), etc.), and the negative electrode active material may include crystalline carbon, amorphous carbon, carbon complex, a carbon material such as a carbon fiber, carbon materials such as carbon nanotubes, Li metal, or Li alloy.

The positive and negative electrode collectors may be formed of one selected from the group consisting of stainless steel, nickel (Ni), copper (Cu), aluminum (Al) or an alloy thereof. The positive electrode collector is formed of Al or an Al alloy, and the negative electrode collector is formed of Cu or a Cu alloy, as such formation increases the efficiency of the battery.

The separator 130 is disposed between the positive electrode plate 110 and the negative electrode plate 120 to prevent a short circuit. The separator 130 further allows Li ions to move therethrough between the positive electrode plate 110 and the negative electrode plate 120. The separator 130 may be formed of a polyolefin-based polymer layer such as polyethylene (PE) or polypropylene (PP), or a multi-layer thereof.

The can 200 may be a container formed of a metallic material having an opened top in a cylindrical shape. Alternatively, the can 200 may be formed in a rectangular or pouch shape. The can 200 may be formed of a metallic material that is lightweight, flexible, and functional as a terminal, for example, Al, an Al alloy, or stainless steel.

The cap assembly 300 may include: a cap 310 coupled with the top opening of the can 200, to seal the can 200 and connected to an external terminal (not shown); a vent member 330 which breaks to exhaust a gas when an internal pressure of the secondary battery reaches a certain level due to the gas generated from the electrode assembly 100; a bottom cap 340 connected to the electrode tap 140; an insulating plate 360 to prevent unnecessary short-circuit between the bottom cap 340 and the vent member 330; and a gasket 370 to insulate the cap assembly 300 from the can 200. A positive temperature coefficient material (PTC) 320 may be disposed between the cap 310 and the vent member 330 so as to improve the stability and reliability of the secondary battery, and a sub plate 350 may be disposed below the bottom cap 340.

The vent member 330 includes a notch 332 and a reinforcement part 334. The notch 332 serves to facilitate breakage of the vent member 330, and the reinforcement part 334 protrudes by a predetermined height in order to prevent bending of the vent member 330 when the vent member 330 is broken.

Figure 3A:
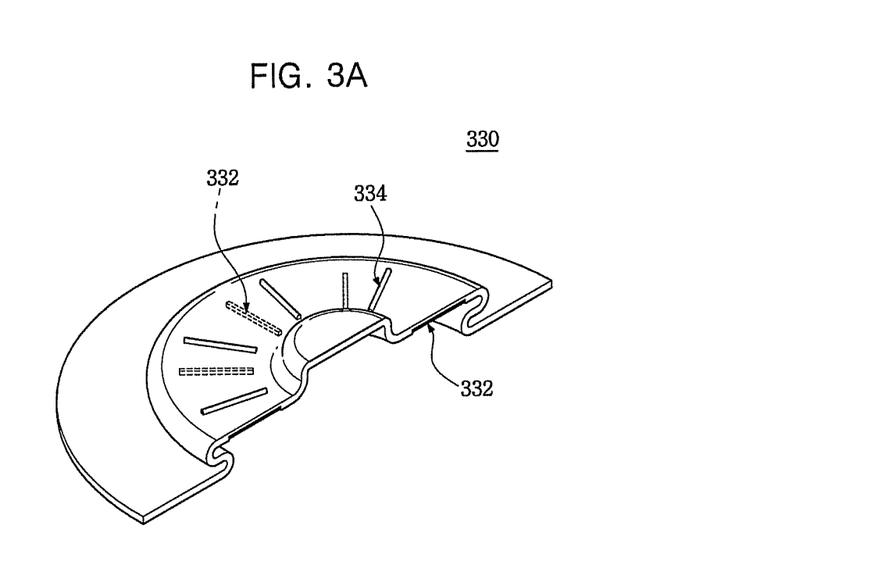
FIGS. 3A and 3B are perspective views of a vent member in a cap assembly according to an example embodiment of the present invention.
Figure 3B:
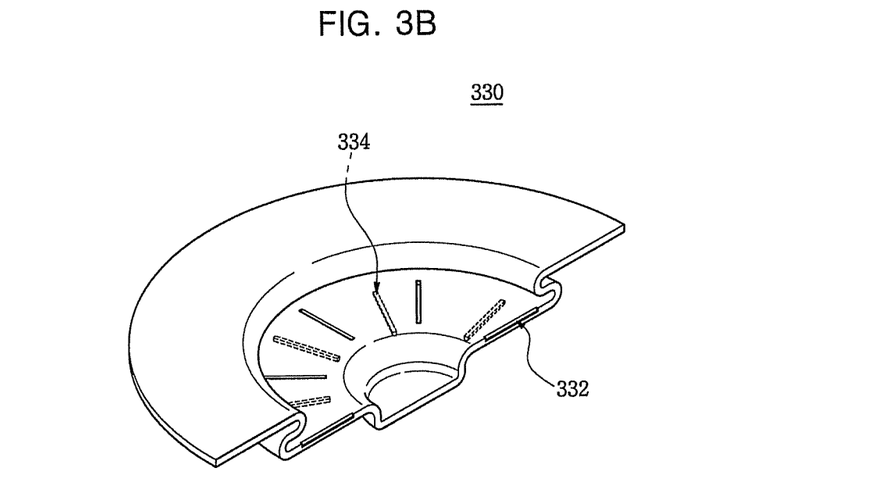

FIGS. 3A and 3B are perspective views of a cross-section of a vent member of a cap assembly according to an example embodiment of the present invention. FIG. 3A illustrates a bottom surface of the vent member 330 disposed toward the can 200 when the cap assembly 300 seals the can 200. Further, FIG. 3B illustrates a top surface of the vent member 330 as viewed from above when the cap assembly 300 is disposed to seal the can 200. Referring to FIGS. 3A and 3B, the cap assembly 300 according to the first exemplary embodiment of the present invention includes a vent member 330 having a plurality of notches 332 and a plurality of reinforcement parts 334. The notches 332 are formed to extend in a radial direction from the center of the vent member 330 to a periphery of the vent member 330 to facilitate breakage of the vent member 330. The notches 332 are portions of the vent member 330 formed to have a decreased thickness with respect to the thickness of the vent member 330. The reinforcement parts 334 protrude from a surface of the vent member 330 to a predetermined height and have a predetermined thickness. The reinforcement parts 334 prevent bending of the vent member 330 when the vent member 330 is broken. The reinforcement parts 334 prevent contact of the vent member 330 with a cap 310 (not shown). When the notches 332 are too deep or shallow, the vent member 330 may malfunction. As such, the depth of the notch 332 may be 0.04 mm to 0.12 mm. When the reinforcement parts 334 are too thick, an area that is opened when the vent member 330 breaks is reduced, and thus the gas is not sufficiently exhausted. However, when the reinforcement parts 334 are too thin, the reinforcement parts 334 do not sufficiently reinforce the vent member so as to prevent the contact of the vent member 330 with the cap 310. As such, the height to which the reinforcement parts 334 protrude may be 1 to 1.5 times greater than the depth of the notches 332.

Although the notches 332 and the reinforcement parts 334 are described to have a depth and a height, respectively, the notches 332 and the reinforcement parts are not limited thereto. For example, the notches 332 may be areas of lower density or lower strength material while the reinforcement parts 334 may be areas of higher density or higher strength material.

To alternately dispose the reinforcement parts 334 and the notches 332, the reinforcement parts 334 are formed between the notches 332. As illustrated in the drawings, the reinforcement parts 334 and the notches 332 may be formed on opposite surfaces of the vent member 330, respectively. In this case, the reinforcement parts 334 may be formed on the surface nearer the electrode assembly 100 of the vent member 330, and the notches 332 may be formed on the surface nearer the cap 310 of the vent member 330. In FIGS. 3A and 3B, although the notches 332 and the reinforcement parts 334 are disposed on the opposite surfaces of the vent member 330, respectively, the notches 332 and the reinforcement parts 334 may be disposed on the same surface of the vent member 330, or the notches 332 and the reinforcement parts 334 may both be disposed on both the top and bottom surfaces of the vent member 330. The notches 332 and the reinforcement part 334 may be symmetrically formed on each surface of the vent member 330. Further, the notches 332 and the reinforcement parts 334 may be formed on opposite surfaces of the vent member 330 but in the same or corresponding areas of the vent member 330 so that the notches 332 and the reinforcement parts 334 may align as illustrated in FIG. 2.

The reinforcement parts 334 may be formed in any shape, which can prevent bending of the broken vent member 330, and their sections may be semi-circular, circular, partially circular, or polygonal. Further, the reinforcement part 334 may be of a circular or polygonal shape about the center of the vent member 330 or of a circular or polygonal shape on the surfaces of the vent member 330.

The secondary battery including the cap assembly 300 according to the first exemplary embodiment of the present invention includes a vent member 330 having reinforcement parts 334 disposed between notches 332 to prevent the contact of the vent member 330 with the cap 310 when the internal pressure is more than a predetermined level and sufficient to cause the vent member 330 to break.

Figure 4A:
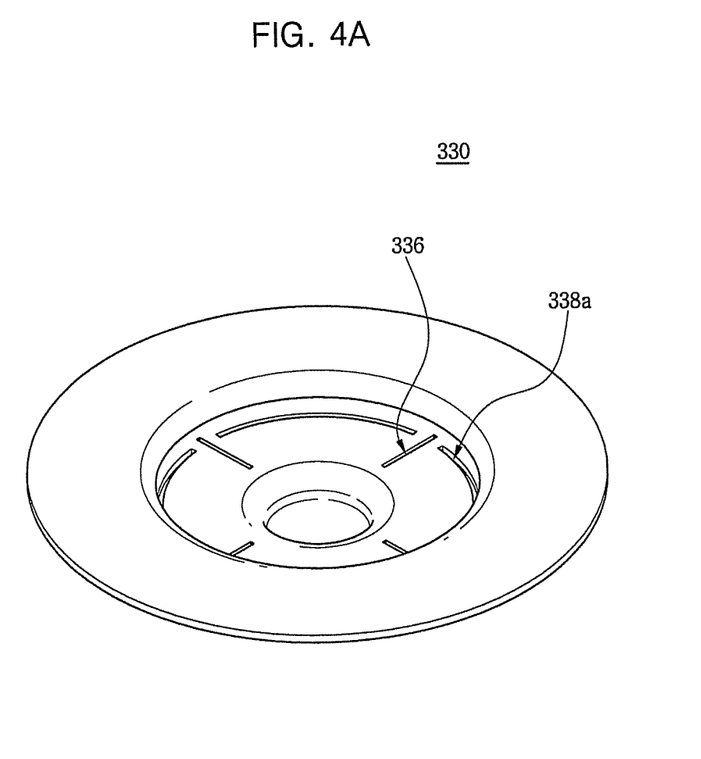
FIGS. 4A to 4C are perspective views of a vent member in a cap assembly according to another example embodiment of the present invention.
Figure 4B:
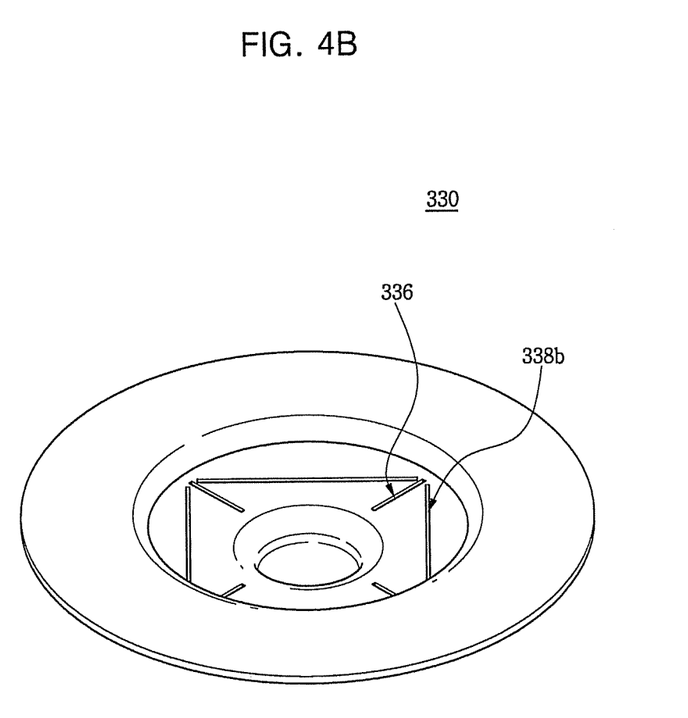
Figure 4C:
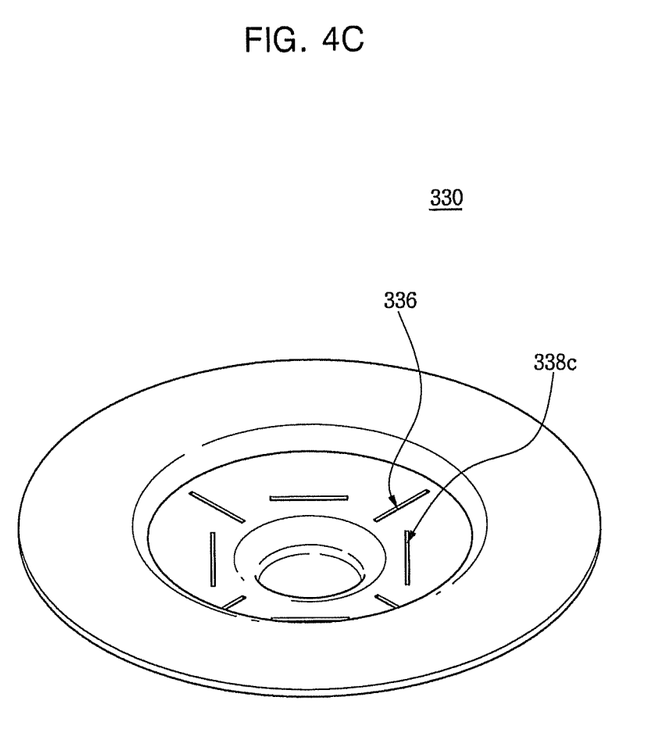

FIGS. 4A to 4C are perspective views of a vent member in a cap assembly according to another example embodiment of the present invention. The secondary battery including a cap assembly comprises the same elements as described above, except for the vent members illustrated in FIGS. 4A to 4C, so a detailed explanation of the secondary battery will be described with reference to the drawing and reference numerals of FIG. 2.

Referring to FIGS. 4A to 4C, a vent member 330 of a cap assembly 300 according to aspects of the present invention has a plurality of first notches 336 formed to extend in a radial direction from the center of the vent member 330 to a periphery of the vent member 330, and second notches 338a, 338b and 338c are formed between two adjacent first notches 336 such that both ends of the second notches 338a, 338b, and 338c are disposed toward two adjacent first notches 336. Therefore, when the internal pressure of the secondary battery is greater than a predetermined level, the vent member 330 breaks but is not bent so as to contact the cap 310. Instead, the vent member 330 is folded along the second notches 338a, 338b and 338c to prevent contact of the broken vent member 330 with the cap 310.

Specifically, when the internal pressure of the secondary battery is greater than a predetermined level, the first notches 336 are broken; however, the second notches 338a, 338b and 338c force the broken vent member 330 to be folded. As such, the second notches 338a, 338b, and 338c may have a decreased depth with respect to the first notches 336. Also, in order to prevent the vent member 330 folded by the second notches 338a, 338b, and 338c from contacting the cap 310, a distance from the second notches 338a, 338b, and 338c to the center of the vent member 330 may be shorter than the distance from the second notches 338a, 338b, and 338c to the cap 310.

The second notches 338a, 338b, and 338c may be formed to correspond to a contour of the vent member 330 as illustrated in FIG. 4A, or may be formed in a straight lines toward each corresponding point of the first notches 336 as illustrated in FIGS. 4B and 4C. With reference to FIG. 4A, the second notches 338a trace the periphery or circumference of the vent member 330 at a predetermined distance from the center of the vent member 330 so as to prevent the folded, broken vent member 330 from contacting the cap 310. As such, the second notches 338a trace the circumference of the vent member 330 at a radius less than the radius of the vent member 330. With reference to FIG. 4B, the second notches 338b extend between outermost ends of the first notches 336 or between the ends of the first notches 336 furthest away from the center of the vent member 330. The second notches 338b are illustrated as extending almost the entire distance between the outermost ends of the first notches 336 but are not limited thereto. For example, in FIG. 4C, the second notches 338*c* extend between the first notches 336. The second notches 338*c* are closer to the center of the vent member 330 than the second notches 338*b* of FIG. 4B and extend between a lesser portion of the distance between the first notches 336 than the second notches 338*b* of FIG. 4B. Although the second notches 338*a* are shown as partially circular and the second notches 338*b* and 338*c* are shown as straight, the second notches 338*a*, 338*b*, and 338*c* may be formed in any shape that prevents contact of the vent member 330 with the cap 310 when the broken vent member 330 is folded. And, in FIGS. 4A to 4C, the first and second notches 336, 338*a*, 338*b*, and 338*c* are formed on the same surface of the vent member 330, but they may be formed on opposite surfaces of the vent member 330, respectively, or the second notches 338*a*, 338*b* and 338*c* may be formed on both surfaces of the vent member 330.

As described above, the cap assembly and the second battery including the same according to aspects of the present invention include a vent member having first notches and second notches formed between two adjacent first notches. Thus, when the inner pressure of the secondary battery is greater than a predetermined level, the broken vent member is folded by the second notches to prevent contact of the broken vent member with the cap.

Further, the reinforcement parts 334 and the first and second notches 336, 338*a*, 338*b*, and 338*c* may be used separately or together. The reinforcement parts 334 may be included in conjunction with the second notches 338*a*, 338*b*, and 338*c* so as to ensure that the vent member 330 does not contact the cap 310 upon breaking.

Consequently, in a cap assembly and a secondary battery having the same according to the present invention, reinforcement parts are formed to protrude from the surface of the vent member to a predetermined height and have a predetermined thickness so as to prevent bending of a broken vent member of the cap assembly, or the second notches may be formed between the first notches so as to fold the vent member and prevent contact of the vent member with a cap. Thus, even when an arc is generated between the vent member and the underlying elements of the vent member, current may be prevented from flowing out of the battery, and stability of the secondary battery may be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cap assembly configured to seal a can of a secondary battery, the cap assembly comprising:
   a top cap configured to connect to an external terminal;
   a bottom cap disposed under the top cap;
   a vent member disposed between the top cap and the bottom cap; and
   an insulating plate disposed between the bottom cap and the vent member,
   wherein the vent member includes a vent body having a protrusion protruding toward the bottom cap, notches disposed in the vent body and a first reinforcement part disposed on the vent body,
   wherein the notches and the first reinforcement part are spaced apart from the protrusion of the vent body, and
   wherein the first reinforcement part does not overlap with the notches.

2. The cap assembly of claim 1, wherein a height of the first reinforcement is 1 to 15 times greater than a depth of the notches, and wherein the depth of the notches is 0.04 mm to 0.12 mm.

3. The cap assembly of claim 1, wherein the vent body includes a first surface and a second surface opposite to the first surface, the first reinforcement parts is disposed on the first surface of the vent body, and the notches are disposed on the second surface of the vent body.

4. The cap assembly of claim 1, wherein the vent member further includes a second reinforcement part, the second reinforcement parts is disposed on the second surface of the vent body, and the second reinforcement part overlaps the first reinforcement part.

\* \* \* \* \*